(12) United States Patent
Kanda

(10) Patent No.: US 7,027,194 B2
(45) Date of Patent: Apr. 11, 2006

(54) IMAGE READING APPARATUS AND IMAGE READING METHOD

(75) Inventor: Takashi Kanda, Kofu (JP)

(73) Assignee: Nisca Corporation, Yamanashi (JP)

(*) Notice: Subject to any disclaimer, the term of this patent is extended or adjusted under 35 U.S.C. 154(b) by 860 days.

(21) Appl. No.: 09/969,155

(22) Filed: Oct. 2, 2001

(65) Prior Publication Data

US 2002/0039207 A1 Apr. 4, 2002

(30) Foreign Application Priority Data

Oct. 3, 2000 (JP) .............................. 2000-304031

(51) Int. Cl.
  *H04N 1/04* (2006.01)
(52) U.S. Cl. .................. 358/496; 358/498; 358/408; 358/474; 358/488; 399/364; 399/367; 399/371; 399/374
(58) Field of Classification Search ................ 358/408, 358/496, 498, 497, 488, 486, 296, 475, 474; 399/374, 376, 371, 367, 364, 370; 382/318, 382/319
  See application file for complete search history.

(56) References Cited

U.S. PATENT DOCUMENTS

| | | | | |
|---|---|---|---|---|
| 4,727,400 A | * | 2/1988 | Ito ............................. 355/75 |
| 5,136,665 A | * | 8/1992 | Inoue ........................ 382/284 |
| 5,313,289 A | * | 5/1994 | Nagane et al. .............. 358/475 |
| 5,392,135 A | * | 2/1995 | Amemiya ................... 358/444 |
| 5,751,438 A | * | 5/1998 | Murai et al. ................ 358/403 |
| 5,991,592 A | * | 11/1999 | Kobayashi et al. ......... 399/374 |
| 6,438,350 B1 | * | 8/2002 | Hasegawa et al. .......... 399/374 |
| 6,552,829 B1 | * | 4/2003 | Maciey et al. ............. 358/509 |
| 6,718,071 B1 | * | 4/2004 | Yoshida et al. ............ 382/289 |

FOREIGN PATENT DOCUMENTS

| | | |
|---|---|---|
| JP | 62-258552 | 11/1987 |
| JP | 10-145538 | 5/1998 |

* cited by examiner

*Primary Examiner*—Cheukfan Lee
(74) *Attorney, Agent, or Firm*—Manabu Kanesaka

(57) ABSTRACT

An image reading apparatus for reading indicia on the front and back surfaces of a document using two image sensors includes a document detection sensor to detect the document, a first image sensor for reading an image on one surface of the document, a second image sensor for reading an image on the other surface of the document, and a controller. The controller starts to read the image data from the first and second image sensors when prescribed amounts of time have passed after the document detection sensor detects the leading edge of the document, and stops the reading of the image data from the image sensors. The structure provides a lightweight and compact apparatus while reducing image noise caused by the mutual interferences of the light sources in reading the image data.

10 Claims, 15 Drawing Sheets

However, S1 is the step count for sheet lengh

However, S1 is the step count for sheet length

IMAGE READING APPARATUS AND IMAGE READING METHOD

BACKGROUND OF THE INVENTION AND RELATED ART STATEMENT

This invention relates to an image reading apparatus and image reading method for scanning and optically reading a document image and outputting the electronic data. More particularly, this invention relates to an image reading apparatus equipped with two optical reading sensors for reading the images on the upper and lower surfaces of a document or sheet fed one by one from a document reception tray by an automatic document feeder commonly known as an ADF.

Image reading apparatuses, normally called scanners, optically read the image of a document and convert the image into electronic data and transmit it to image forming apparatuses, such as personal computers, copy machines or facsimiles. Image forming apparatuses are also normally equipped with the following types of image reading apparatuses.

The image reading apparatuses have image sensors for reading the images on a document or sheet transferred one by one from a document reception tray by an automatic document feeder. Furthermore, recent image reading apparatuses have been proposed to have functions to read the images on the upper and lower surfaces of a document or sheet fed one by one by the automatic document feeder on one document transport path without transferring to a switch-back pass, by using two individual image sensors.

Examples of the image reading apparatuses that are equipped with two image sensors to read the images on the upper and lower surfaces of a document are Japanese Patent Publications (KOKAI) No. 62-258552 (hereinafter referred to as prior art 1), and No. 10-145538 (hereinafter referred to as prior art 2).

The image reading apparatus as disclosed in prior art 1 discloses lighting apparatuses for both upper surface and lower surface of a document or sheet, and an optical system that employs CCD and a line sensor to simultaneously read indicia on both surfaces of the document.

Also, in the facsimile apparatus disclosed in the prior art 2, as shown in FIG. 15 (FIG. 2 and FIG. 5 of the same publication), a line image sensor 123 for reading the indicia on the upper surface of a document starts to read the image data on the upper surface based on the detection of the leading edge of the document by a document sensor 122, and a line image sensor 124 for reading the images on the bottom surface of the document starts to read the image data thereof. Also, because the line image sensor 124 is located at a position away from the line image sensor 123 for a distance of only L2, if both line image sensors are driven at the same time, the image signals on both surfaces offset the line count equivalent to the distance of L2. Thus, by always monitoring the offset line count, transport errors of the document are determined.

Also, as an image sensor reading operation controller, it employs the output signals from the image sensor and a clock for synchronization as well as a drive controller to stop reading, as the method to control the reading operation.

In order to form a lighter weight and more compact image reading apparatus for reading the image data on both surfaces of documents or sheets, it is essential to locate a reading position for reading the images on one surface of a document (upper surface) and a reading position for reading the images on the other surface of a document (lower surface) as close as possible without a large gap therebetween. If the upper surface reading position and the lower surface reading position are disclosed close to each other, there is increased a danger of the light from the light source device for illuminating one surface of the document passing through the document sheet and being detected by the image sensor on the other surface, so that the mutual interferences of the upper and lower light sources cause electronic noise in the image data read from both surfaces.

However, in the prior art 1, both the line sensor for reading the upper surface of the document and the line sensor for reading the lower surface of the document use optical system (optical reduction type employing CCD) line sensors. Therefore, if the reading position for the one or upper surface of the document and the reading position for the other or lower surface of the document are arranged in the same position, the apparatus will become more compact and lightweight, but image data read from both surfaces will cause noise to be generated.

Also, in the prior art 2, the first line sensor for reading the indicia on the upper surface of the document starts to read the image data from the upper surface of the document based upon the detection of the leading edge of the document by the document sensor, and the second line sensor for reading the indicia on the lower surface of the document operates simultaneously with the detection by the document sensor. In such case, if monitoring the line count offset according to the distance LD for the image signal of both surfaces, an unnecessary amount of image data is recorded, requiring the entire controller device to be more complex, thus making it impossible to lighten the weight of the apparatus and to make the overall apparatus more compact. Furthermore, in the prior art 2, as in the prior art 1, there is no disclosure regarding the reduction of the image noise that occurs by the mutual interferences of the upper and lower light sources in reading the image data from both surfaces.

Thus, an object of the present invention is to provide a document reading apparatus to read indicia on both surfaces of a document or sheet using two image sensors, which is light in weight and more compact, and has a small distance of the gap between a first image sensor and a second image sensor to reduce the image noise caused by the mutual interferences of the upper and lower light sources as little as possible.

Another object of the present invention is to provide a document reading apparatus to read the indicia on both surfaces of the document using two image sensors, wherein a controller for reading images is simplified to reduce the weight and to make the apparatus more compact.

Further objects and advantages of the invention will be apparent from the following description of the invention.

SUMMARY OF THE INVENTION

The image reading apparatus is directed to read indicia on the upper surface and the lower surface of a document or sheet transferred by an automatic document feeder for feeding one sheet at a time. The documents or sheets are stacked on a document supply tray. The apparatus includes a document detection sensor to detect the document transported from the document supply tray, a first image sensor for reading the images on one surface of the document, a second image sensor for reading the images on the other surface of the document, and a controller device. The controller device starts reading from each of the first image sensor and the second image sensor at the point when prescribed amounts of time have passed after the document detection sensor detects the leading edge of the document.

Furthermore, the apparatus may include a document sensor for detecting the document transported from the document supply tray, a first image sensor for reading the images on one surface of the document, a second image sensor for reading the images on the other surface of the document, and a controller device. The controller device stops the reading from each of the first image sensor and the second image sensor at the point when prescribed amounts of time have passed after the document detection sensor detects a trailing edge of the document. This simplifies the timing control for starting the reading of the image data in the present invention.

The first light source included in the first image sensor and the second light source included in the second image sensor are controlled so that each is lit just prior to start the reading of the image data on each surface of the document and each is extinguished just after reading the image data. Also, while simultaneously taking or reading the image data from the first image sensor and the second image sensor, the quantity of light from at least one of the first image sensor and the second image sensor is controlled, so that the mutual interferences of light radiating from the upper and lower light sources are minimized and the generation of noise in the image data read from both surfaces of the document is reduced as little as possible.

Here, the first image sensor is composed of an optical reduction reading sensor and the second image sensor is composed of a contact image sensor.

In addition, a straight transport path is formed along at least the first image sensor and the second image sensor throughout the document sheet path, to eliminate slippage of any rollers on the document and to allow the smooth travel of the document thereby enabling the accurate reading of the images on both of the upper and lower surfaces thereof.

This invention substantially simultaneously takes the image data from both the upper and lower surfaces of the document using two individual image sensors, so that the controller means of this apparatus converts the image data taken by the first image sensor and the second image sensor from analog signals to digital signals, and is equipped with memory means to temporarily store that data in the duplex reading mode. It reciprocally outputs the image data from the image line of one surface of the document taken by the first image sensor and the image data from the image line of the other surface of the document taken by the second image sensor.

Also, in the invention, an image reading apparatus reads the indicia on both the upper surface and the lower surface of the documents transported by automatic document feeder means for feeding documents stacked on a document supply tray one sheet at a time. The apparatus is composed of transport rollers for transporting documents from the document supply tray toward a reading position, first light source means comprising a xenon lamp to illuminate one surface at the reading position of the document transported by the transport rollers, a first image sensor for reading the light reflected from the document illuminated by the first light source means, second light source means comprising an LED (light emitting diode) disposed downstream of the first reading position in the document transfer direction transported by the transport rollers, to illuminate the other surface of the document transported at a second reading position, a second image sensor to read the light reflected from the document illuminated by the second light source means and a white plate to shield light from the first light source arranged opposite to the second image sensor. These together prevent interferences of the lights from the first light source and the second light source, and because a white plate is arranged, the apparatus is capable of reading the image data properly even from a thin document.

DETAILED DESCRIPTION OF PREFERRED EMBODIMENT

Figure 1:
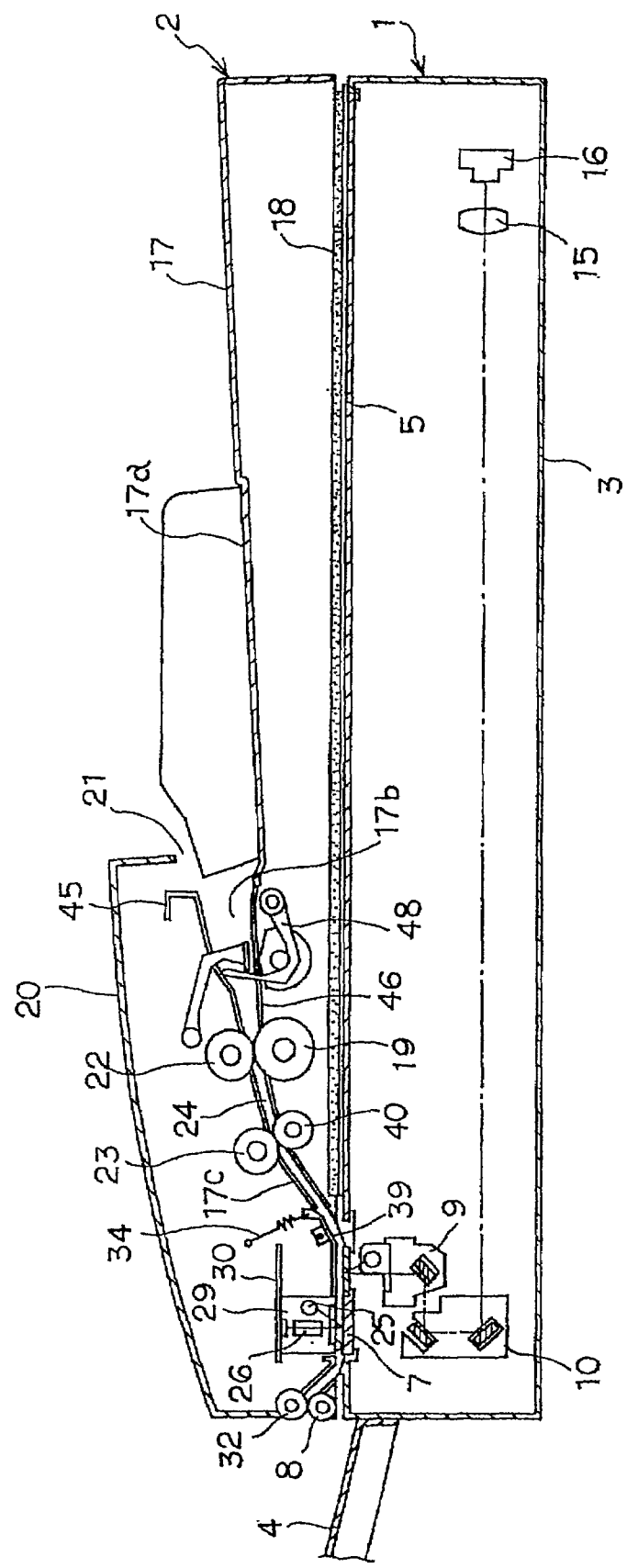
FIG. 1 is a longitudinal sectional view of the entire structure of an image reading apparatus according to the first embodiment of the invention.
Figure 2:
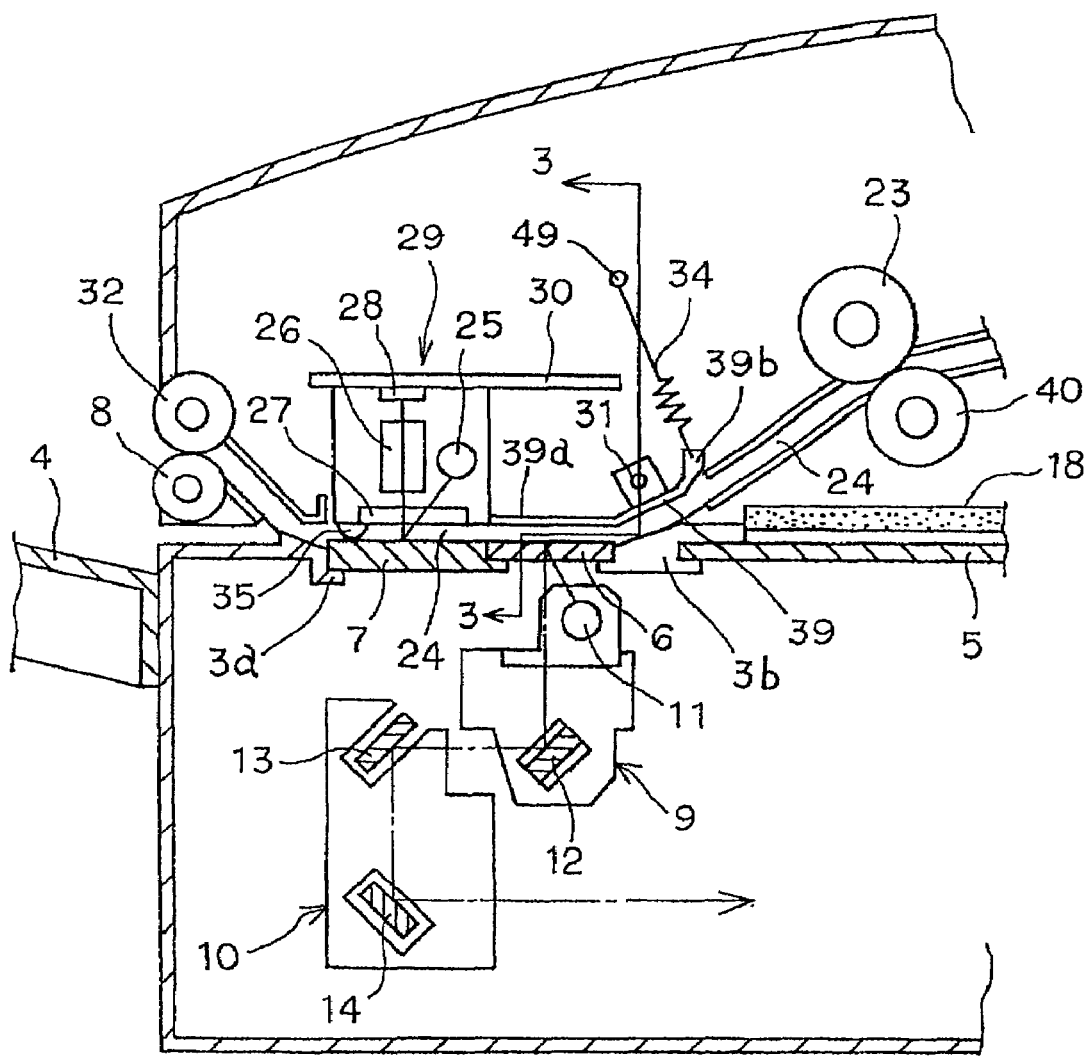
FIG. 2 is a partly enlarged sectional view of essential members of the embodiment shown in FIG. 1.
Figure 3:
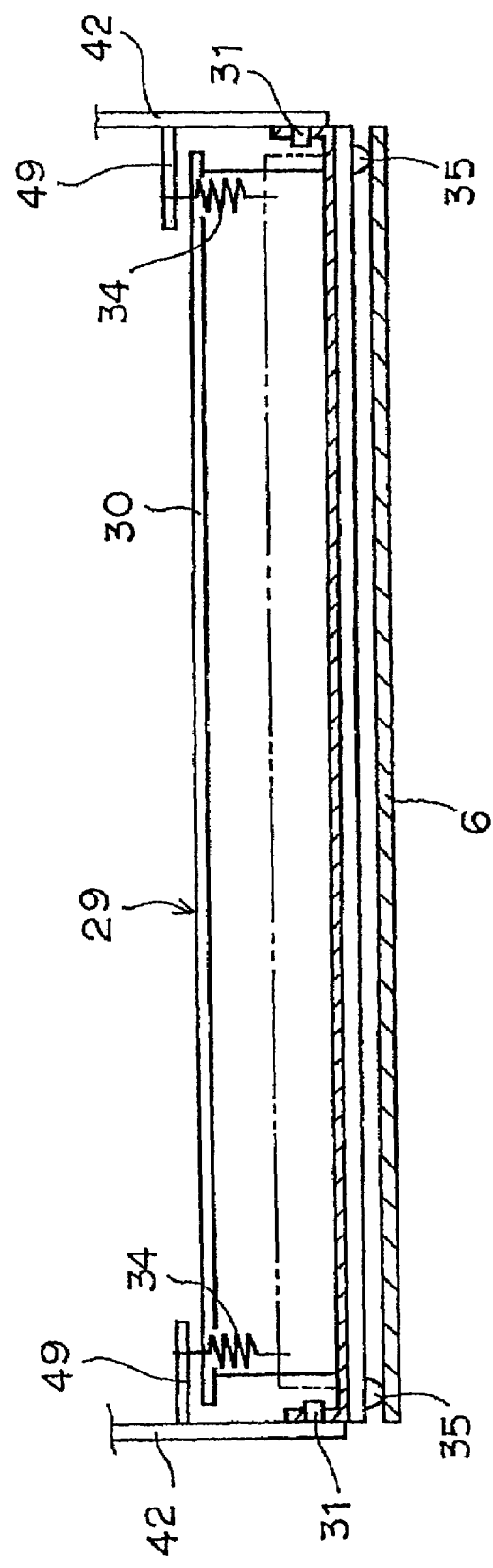
FIG. 3 is a sectional view taken along line 3—3 of FIG. 2.
Figure 4:
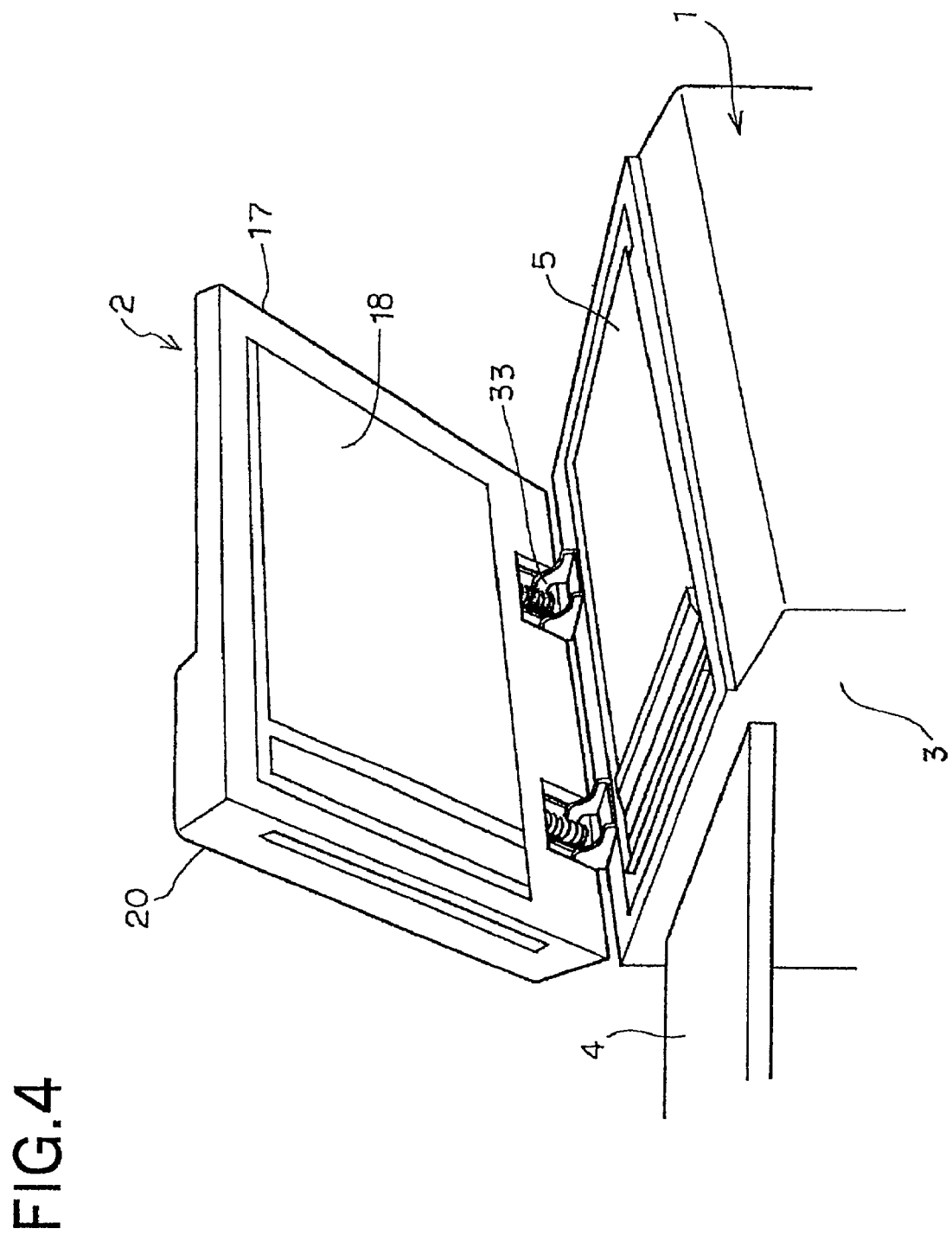
FIG. 4 is perspective view showing an upper unit of the image reading apparatus according to the first embodiment of the invention shown in FIG. 1 in an upwardly opened state.

The following is a detailed explanation of the preferred embodiment of the present invention based on the figures provided. FIG. 1 is a longitudinal sectional view of the entire structure of the image reading apparatus relating to the invention. FIG. 2 is a partly enlarged sectional view of the essential members of FIG. 1. FIG. 3 is a sectional view taken along line 3—3 of FIG. 2. FIG. 4 is a perspective view from the upper part of FIG. 1 showing the upper unit of the image reading apparatus according to this embodiment with the top open upwardly.

In FIGS. 1 to 4, the upper unit 2 is mounted via hinges 33 to the main unit 1 to open upwardly. The outer side of the unit 1 is formed by a frame 3, and a discharge tray 4 is fastened to one side of the frame 3. Also, on the upper side of the frame on the opposite side of the discharge tray 4, there is incorporated a platen 5 (third platen) which is a transparent glass plate for placing a thick original for reading when the upper unit 2 in FIG. 1 is opened in the upper direction.

Also, on the opposite side of the platen 5 relative to the fastening unit 3b which is a part of the frame 3 to fasten the platen 5, a platen 6 (first platen) which is a transparent glass plate to support documents or sheets for reading the images fed one by one, and a platen 7 (second platen) which is formed of a non-transparent white material to support the documents for reading the images one by one similarly, are incorporated in one unit. The fastening unit 3b fastens the platen 6 to a step notched on the edge of the platen 6. The platen 6 and platen 7 are substantially the same shape and their thicknesses are formed to be exactly the same.

Furthermore, on the upper surface of the frame 3, a fastening unit 3a is formed to fasten the platen 7 in the same way as in the fastening unit 3b. One edge of the platen 7 is formed with a notch of equivalent thickness as that of the platen 6 which abuts against the platen 6 for fastening. In this way, the edges of the platens 6 and 7 are both supported by the fastening units 3a and 3b, and the other edges are respectively fastened to other edges and their upper surfaces are fastened to the frame 3 to form a single flat surface.

A pair of discharge rollers 8 and 32 is located on the end of the discharge tray 4 to discharge the documents. The discharge roller 8 is driven by a motor that is not shown in the drawings.

The frame 3 internally stores a reduction optical system image sensor to convert the read image data into electrical signals. Numerals 9 and 10 are carriages that form a part of the reduction optical system image sensor and interlocked to maintain a prescribed distance relationship while being driven by a motor (not shown in the drawings). In other words, the carriage 10 moves inside the frame 3 in the left and right directions of the drawing.

On the carriage 9 in FIG. 1 either in a fixed position or a moving situation, there is formed a light source 11 for producing light to illuminate the document and a reflecting mirror 12 for receiving light reflected from the document illuminated by the light source 11 and converting the direction to a horizontal direction reflected light.

On the carriage 10 in FIG. 2, there are mounted a reflective mirror 13 to convert the horizontal direction reflected light reflected from the reflective mirror 12 to a vertical direction light beam and a reflective mirror 14 that converts the direction of the reflected light reflected by the reflective mirror 13 to a horizontal direction reflected light in a direction opposite to that of the light reflected from the reflective mirror 12. Numeral 15 is a lens for focusing light received from the reflective mirror 14. The carriages 9 and 10, light source 11, reflective mirrors 12 to 14 and light condensing lens 15 form a reduction optical system image sensor. Numeral 16 is an image sensor comprising a CCD that receives reflected light focused by the light condensing lens 15 and converts that into electrical signals. An output end of an image sensor unit 16 is connected to a lead wire, not shown in the drawings. Through this lead wire, the image signals of light reflected from the document are converted and transmitted as electrical signals into an electrical device, such as a facsimile device, in a copy machine unit which is not shown in the drawings.

The outside of the upper unit 2 is formed by a frame 17 and an upper lid 20. A pressure member 18 having resiliency to lightly press and hold a document placed on the platen 5 is fastened on the main unit 1 below the frame 17. The pressure member 18 is formed of a layer with a plurality of holes, such as a sponge, having a thickness that allows resilient deformation and a soft surface layer covering the layer with a plurality of holes from the bottom surface.

Numeral 17a is a document reception tray for stacking the documents to be fed one by one with indicia thereof to be read. The document reception tray 17a is formed low at the side of the platen 6 to allow the documents to move to the platen 6. At the document reception tray 17a near the platen, there are formed a pair of paper feed rollers 19 and 22 that pinch the document to supply to the platen 6 one by one stacked on the document reception tray 17a. A part of the frame 17 on the right side of the feed roller 19 forms the flat portion 17b. Between this flat portion 17b and the upper lid 20 which stores the contact image sensor and is described later, an entrance 20 is formed to receive the documents to transport them one by one to the image sensor. A pair of transport rollers 40 and 23 is formed in the same way as the feed rollers 19 and 22 between the entrance 21 and platen 6 to transport the documents inserted from the entrance 21 to the platens 6 and 7. Also, from the feed rollers 19 and 22 up to the aforementioned discharge roller 8, a document transport path 24 is formed to pass through the upper and lower plate members 45 and 46 including a flat portion 17c. The discharge rollers 19 and 40 are driven by a motor that is not shown in the drawings.

Furthermore, numeral 48 is an upper guide for introducing the documents from the document reception tray 17a to the transport path 24 and a stopper to stop introduction of the documents which operates according to the timing of reading and paper feeding.

A light source 25 to illuminate the images on the other surface (surface facing upward) of the document transported into the transport path 24, a protective glass 27 to pass the illuminating light and light reflected from the other surface of the document, a Selfoc lens 26 to make the reflected light parallel, an image sensor unit 28 for detecting the light passing through the Selfoc lens and for converting it into electrical signals, a circuit board 30, are fixed as a single unit to form a compact image sensor (hereinafter referred to CIS).

A plate-shaped backup guide 39 is fastened at the edge of a member 39a in the direction of transport to the CIS forming the CIS unit 29. The backup guide 39 is supported by a pair of rotation pins 31 (FIG. 3) that protrude from left and right side plates 42 on the upper lid 20, and the CIS unit 29 rotates around the rotation pins 31 as the fulcrum. Also, one end of each of a pair of pressure springs 34 to press downward the CIS unit 29 is attached to the transport path rear direction portion 39b in the backup guide 39 (FIG. 3), and the other end thereof is attached to each of spring support members 49 which protrude to the side from the upper sides of the left and right side plates 42. As shown in FIG. 2, at the lower portion of the discharge rollers 8 and 32, spacers 35 are formed on the right and left corners of the CIS unit 29. These adjust a gap between the bottom surface of the CIS unit 29 extending to the back-up guide 39 and the protective glass 27, and the transport path 24 between the platens 6 and 7, so that the gap becomes suitable for receiving the light image focused on each of the image sensors.

In the image reading apparatus, sensors, such as document detection sensors are formed to detect the document transported one by one from the document supply tray, and a control circuit is disposed to control the circuit drive operation of the transport motor (not shown) based on the sensors' detection signals, the movement of the carriages 9 and 10, the flashing of the light sources 11 and 25, and the starting and stopping of image data intake from the image sensors 16 and 28.

The following explains the image reading apparatus relating to this invention and how images are read.

Figure 5:
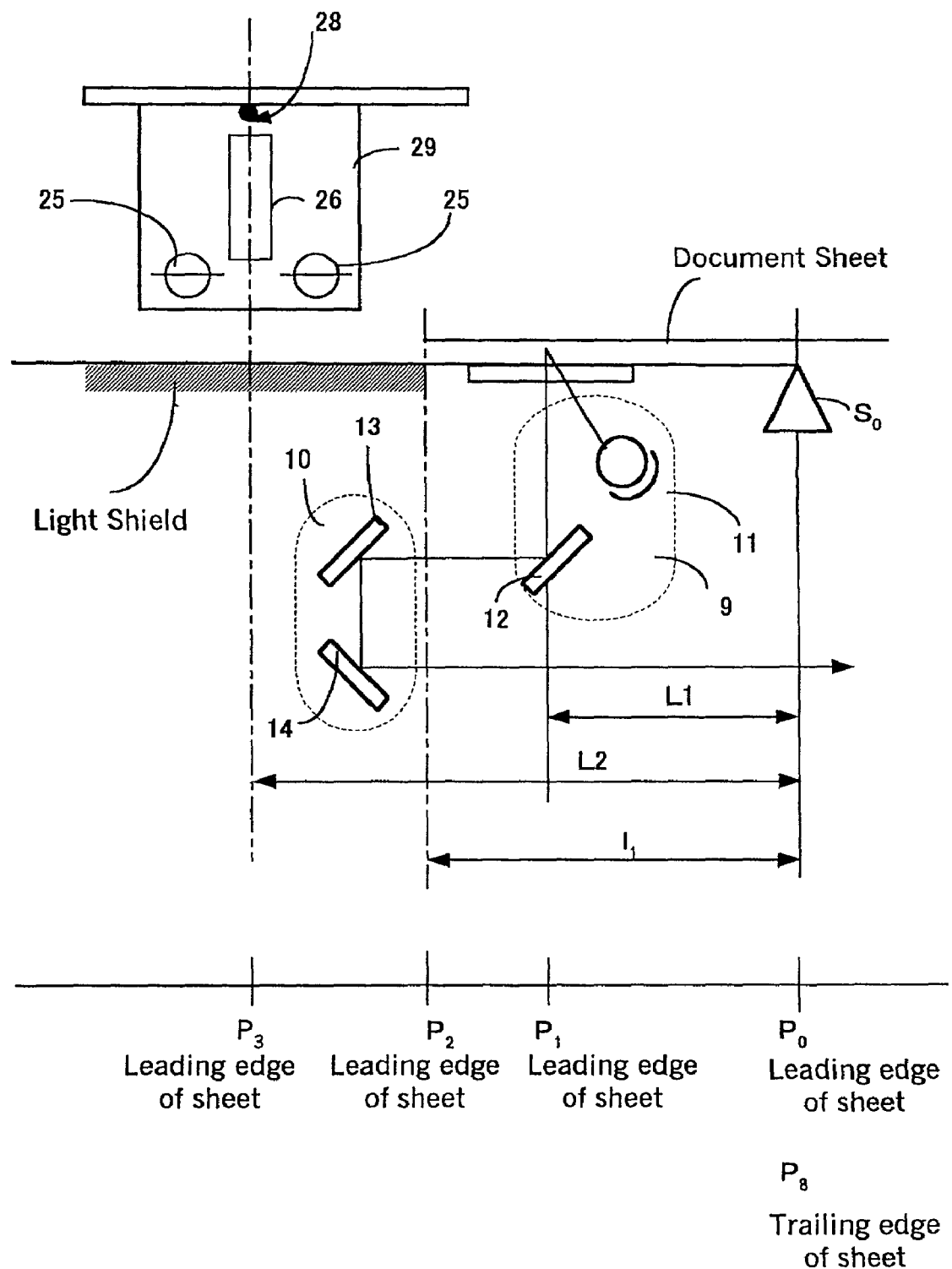
FIG. 5 shows a relationship of the arrangement of mechanical elements of the image reading apparatus.

FIG. 5 shows a relationship of the arrangement of the mechanical elements of the image reading apparatus. The documents fed one by one from the document reception tray are transported to the image reading station for the indicia on both surfaces thereof to be read. In this apparatus, transport of the documents is performed by a stepping motor (not shown) and the travel of the documents is accurately controlled by the pulse count inputted to the stepping motor.

As shown in FIG. 5, at the entrance of the image reading station, there is arranged a document detection sensor So to detect the document that has been transported thereto. Also, at the distance L1 spaced from the document detection sensor So, the first image sensor for reading indicia on one surface of the document (lower surface) is disposed, and at the distance L2 spaced from the document detection sensor So, the second image sensor for reading indicia on the other surface of the document (upper surface) is disposed.

The structures of the first image sensor and the second image sensor are explained in FIG. 1 and FIG. 2, each being equipped with the first light source 11 and the second light source 25 for illuminating the appropriate surfaces of the document. The light source 25 uses an LED here to lighten the weight of the second image sensor. There are also 2 rows arranged on both sides of the reading line to achieve a balance with the light amount from the first light source 11.

Here, if the gap between the first image sensor and the second image sensor is made smaller, the apparatus is made more compact. However, the radiating lights from the first light source 11 and the second light source 25 will pass through the document to interfere with each other thereby increasing the danger of noise applied to the image reading data. On the other hand, increasing the distance for the gap between the first image sensor and the second image sensor will reduce the danger of the light interference from the light sources, but can not make the apparatus more compact. In this apparatus, the distance for the gap between the first image sensor and the second image sensor is made small while eliminating the mal-effects of the mutual interference of the aforementioned lights.

For that reason, on this apparatus, as shown in FIG. 5, the transport path of the documents from the document detection sensor So to the first image sensor and the second image sensor is shortened as little as possible, and by making it in a direct straight line, the apparatus is made more compact while allowing the smooth travel of the documents and the fine reading of the image data.

Also, a white light shield to shield the light from the aforementioned first light source is arranged opposite to the second image sensor. These together prevent the interference of the lights from the first light source and the second light source, and because the white plate is arranged, it provides an apparatus that is capable of quality reading of the image data even from a thin document.

Figure 6:
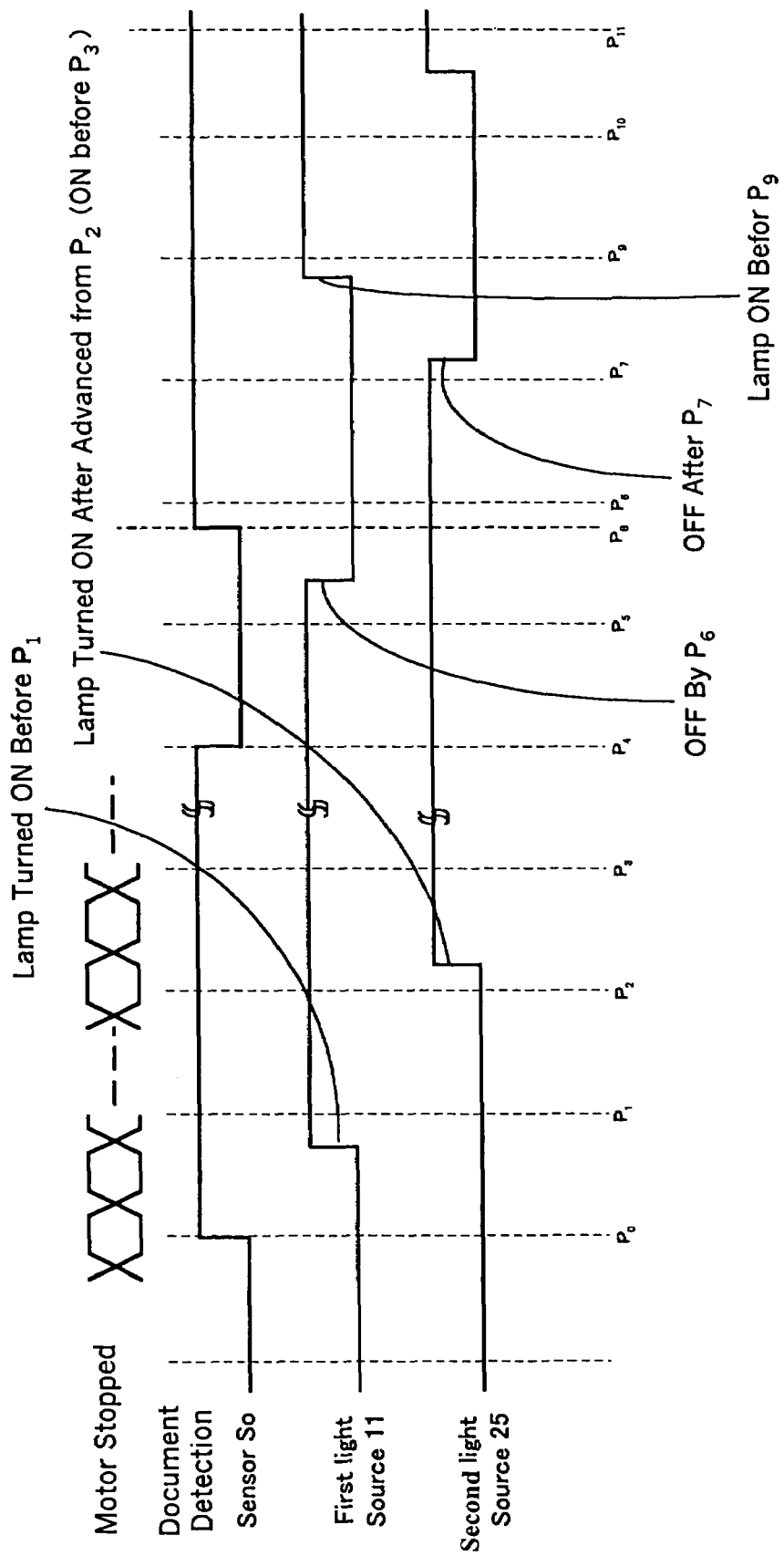
FIG. 6 is a flashing control sequence of a first light source and s second light source.
Figure 7:
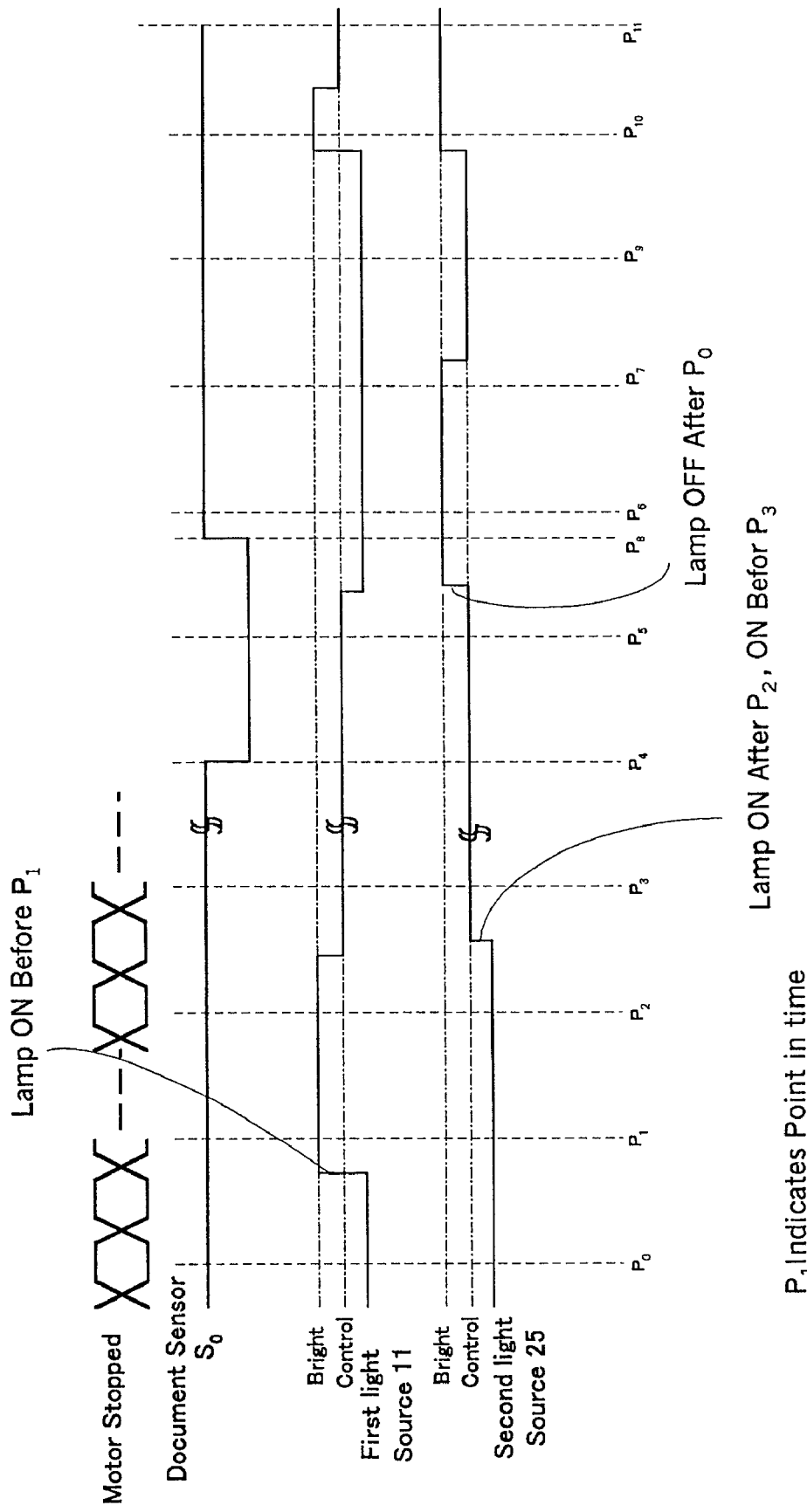
FIG. 7 is a flashing control sequence and a quantity of a light suppressing control sequence of the first light source and the second light source.

Next, referring to FIGS. 5 to 7, explanation is made for the method in this invention to reduce the mutual interference of lights from the light sources of the first image sensor and the second image sensor, which are disposed adjacent to each other.

The control apparatus of this invention starts the counter at the point that the leading edge of the document transported to the image reading station have passed the document detection sensor S0 position P1.

As described above, the travel of the document is accurately controlled by the pulse count charged to the stepping motor, thus the control apparatus can accurately detect the time required for the leading edge of the document to reach from the document detection sensor S0 to the reading position of the first image sensor to read the bottom surface of the document. In other words, the control apparatus starts counting of the pulses charged to the stepping motor for the prescribed time after the document detection sensor detects the leading edge of the document. Then, because the distance of the gap between the document detection sensor and the first image sensor reading position is fixed as L1, at the point the count reaches a prescribed value, the leading edge of the document has reached the first image sensor reading position. In the same way, because the distance of the gap from the document detection sensor So to the reading position of the second image sensor to read the upper surface of the document is also fixed as L2, the time required to reach the reading position of the second image sensor after the leading edge of the document sheet passes the document detection sensor So is also fixed.

Through this, when the aforementioned document detection sensor detects the leading edge of the document, the apparatus' control means controls the first image sensor and the second image sensor to start obtaining the image data from both of the surfaces of the document after a predetermined amount of time has passed (just before the leading edge of the sheet has reached each of the reading positions).

Also, after the trailing edge of the document has passed the document detection sensor So, a timing to pass each of the reading positions of the first image sensor and the second image sensor is known in advance. Therefore, after the aforementioned document detection sensor detects the trailing edge of the document and after passing predetermined amounts of time, it controls to stop the taking of image data from both surfaces of the document from the first image sensor and the second image sensor.

The document transport path leading from the document detection sensor So to the first image sensor and the second image sensor in this invention is short and is configured in a straight line throughout the travel of the document smoothly without slippage, so it is possible to obtain accurate timing for the starting and stopping in taking the image data from the first image sensor and the second image sensor in reference to the document detection sensor So position.

Next, to reduce as little as possible the mutual interferences caused by the light sources of both the first image sensor and the second image sensor that are formed close to each other in this invention, the first light source 11 included in the first image sensor and the light source 25 included in the second image sensor are controlled to light just before starting the image data reading from each of the surfaces of the document and to extinguish just after the stopping of reading of the image data. This completely eliminates the aforementioned mutual interferences caused by the two light sources of 11 and 25, excluding when the sheet is passing over a specific range (space from L1 to L2 in FIG. 5).

FIG. 6 is a timing chart to explain the control of the flashing of the light sources. In FIG. 6, after the document passes the setting position Po of the document detection sensor So, the light source 11 lights just prior to the reading position P1 for the first image sensor and the taking or reading of the image data starts. Next, after the leading edge of the document passes the predetermined position P2 that has been pre-set, the light source 25 for the second image sensor lights just before the document reaches the reading position for the second image sensor. Then, the trailing edge of the document passes the document detection sensor So and after passing the reading position of the first image sensor, the light source 9 is extinguished, i.e. the image reading has been completed. In the same way, the light source 25 for the second image sensor is extinguished when the trailing edge of the document passes the document detection sensor So and passes the reading position for the second image sensor, i.e. the image reading has been completed. Numerals P0 to P3 indicate the time relating to the leading edge of the document and P4 to P7 indicate the time relating to the trailing edge of the document.

When the next document is transported, it repeats in the same way, and the first image sensor and the second image sensor are controlled to light prior to starting the taking or reading of image data from both surfaces of the document and to extinguish after stopping the reading of the image data. This control of the lighting and extinguishing of the light sources is used effectively in the timing for shielding the light by the document. For example, when the document is transported between the P2 and P3, as the timing to light the second light source 25, the shielding of that light for the first image sensor by the document is selected.

Through this kind of control, only one light source is lit when either the leading edge or the trailing edge of the document is at a position in a prescribed range so that the mutual interferences of the two light sources of 11 and 25 are eliminated. However, while both of the two light sources of 11 and 25 are lit simultaneously, they mutually interfere with each other. So, the control means of the present invention enables a control to suppress the quantity of light from each of the first light source 11 and the second light source 25 while both the first image sensor and the second image sensor are taking the image data from the document sheet.

FIG. 7 shows an example of the timing chart to explain the embodiment for suppressing the quantity of light while controlling the flashing of the two light sources explained in FIG. 6. The difference from the timing chart of FIG. 6 is that the first light source 11 and the second light source 25 are lit at the rated brightness when one of either the first image sensor or the second image sensor is lit independently, and when both light sources are lit simultaneously, in other words, when taking the data from both the front and the lower surfaces of the document, the quantities of lights irradiating from the two light sources are suppressed. Thus, the image reading apparatus of the present invention enables the reduction of the mal-effect caused by the mutual interferences of the lights of the two light sources arranged opposite to and close to each other, even if the document is thin. In the embodiment of the present invention, the second light source 25 is electrically controlled to adjust the quantity of light because it employs an LED. The first light source 11 is a xenon lamp and because it is not lit by an inverter, the average current is controlled by controlling the duty of the electric power output.

When controlling the quantities of lights of the two light sources in this way, it is good to adjust by the control means the balance of the intensity of the image data on the bottom surface detected by the first image sensor and the image data on the upper surface detected by the second image sensor. Several methods to adjust the intensity of the image data from the front and lower surfaces are well known and will not be described in detail here, but one example is to form a sensor to measure the transparency ratio of light from the document and revise gamma table offset processing data for both the front and lower surfaces based on this analog output value and to balance the intensity of both the front and lower surfaces.

Figure 8:
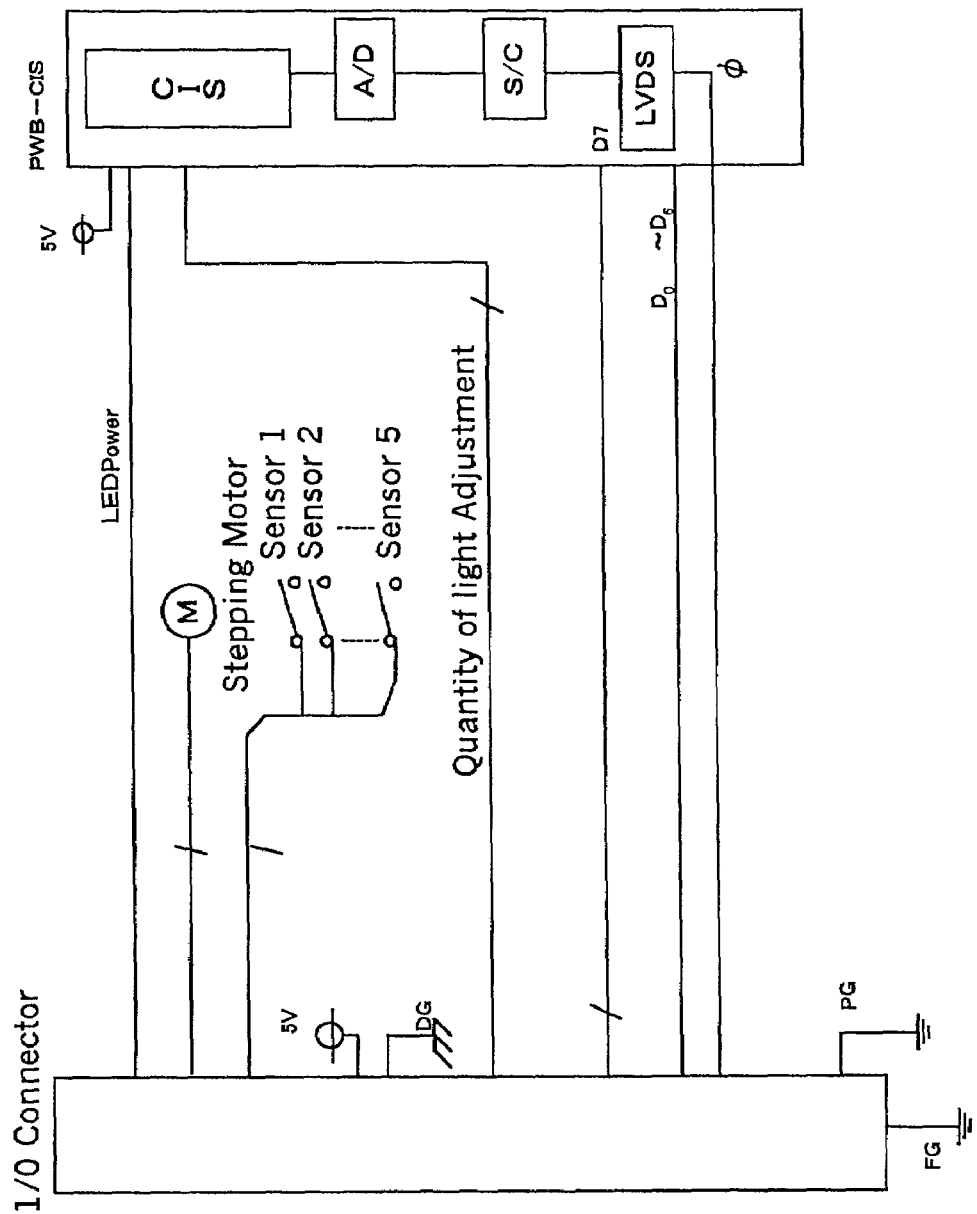
FIG. 8 is an example of a control configuration block in an ADF on this apparatus.
Figure 9:
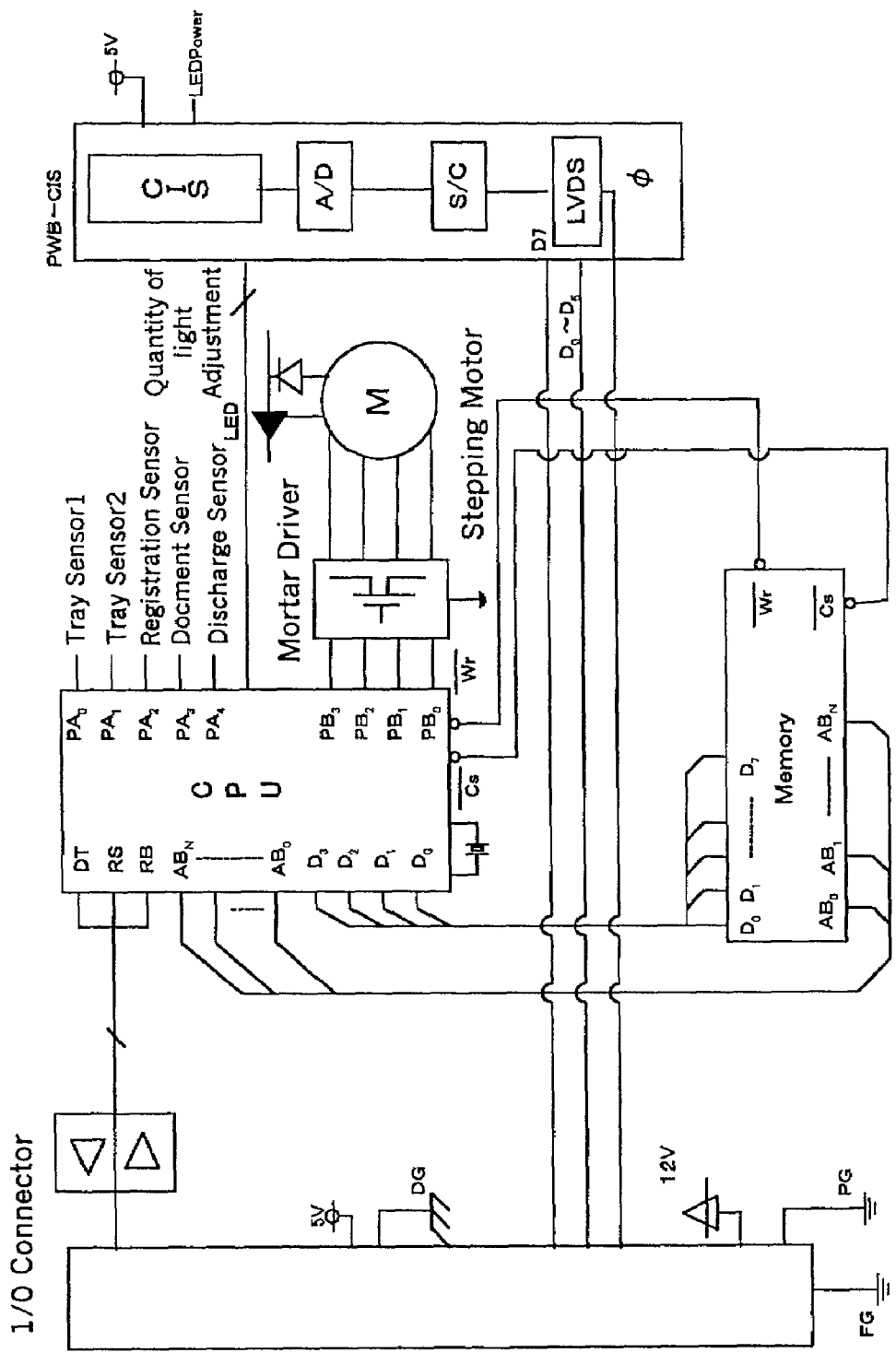
FIG. 9 is an example of the control configuration block to offset an L amount in the ADF on this apparatus.

FIG. 8 and FIG. 9 show an example of the control configuration block of this apparatus. FIG. 8 is a control configuration block in the ADF on this apparatus of one embodiment of the present invention. As is shown in the drawing, the stepping motor, sensors and image sensors in the ADF are connected to external devices via an I/O connector shown in the figures, the external devices performing various controls. Here, the second image sensor comprises a CIS line sensor, analog-digital conversion circuit (A/D), signal shading offset circuit (S/C), LED and a prescribed interface circuit (LVDS: Low Voltage Differential Signaling) arranged and configured on a printed circuit board.

The quantity of light from the LED is control via the I/O connector. In the embodiment of the present invention, it is possible to adjust the quantity of light to 8 levels using a 3 bit control wire as shown in the figure.

In this invention, two image sensors are used to substantially simultaneously take the image data from both the front and lower surfaces of the document, so it is preferred to offset the difference of the image data positions of the two by the amount of L.

FIG. 9 is an example of the control configuration block diagram to offset the L amount in the ADF. In FIG. 9, signals from the external devices and sensors are received to control the adjustment of the quantity of light for the CIS, which is the second image sensor, and to control the stepping motor circuits on one programmable CPU (PROM). Here, the aforementioned PROM is connected to a memory and stores the data for offsetting L amount.

Figure 10:
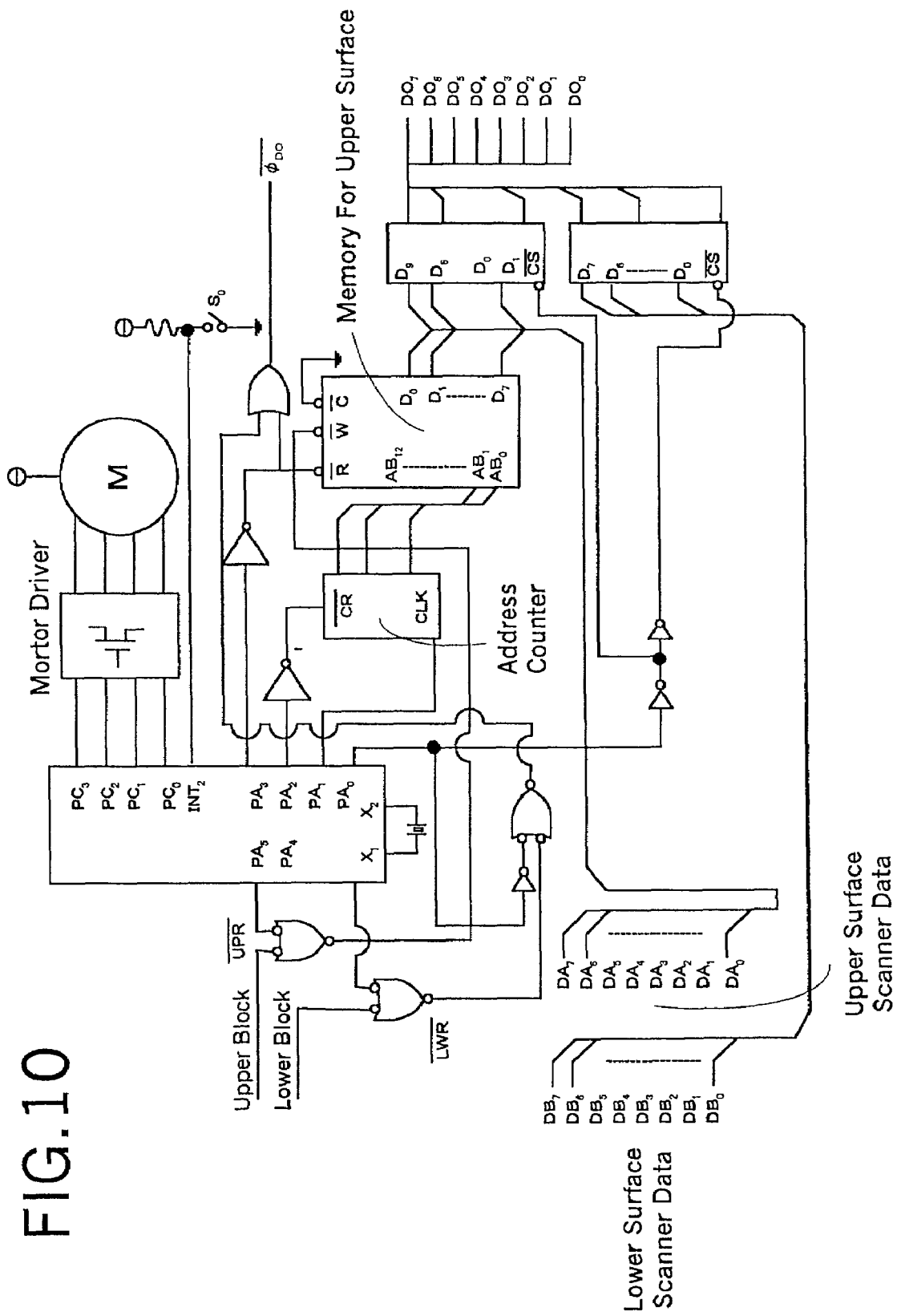
FIG. 10 is an example of the L amount offset control circuit configuration.

FIG. 10 is an example of the L amount offset circuit. In the circuit example, there is equipped a memory for the upper surface to temporarily store image data from the upper surface of the document read by the CIS, which is the second image sensor, and it offsets the discrepancy of the position with regard to the image data on the bottom surface of the document read by the first image sensor and is capable of alternately output the image data of both surfaces of the document to an external apparatus.

Figure 11:
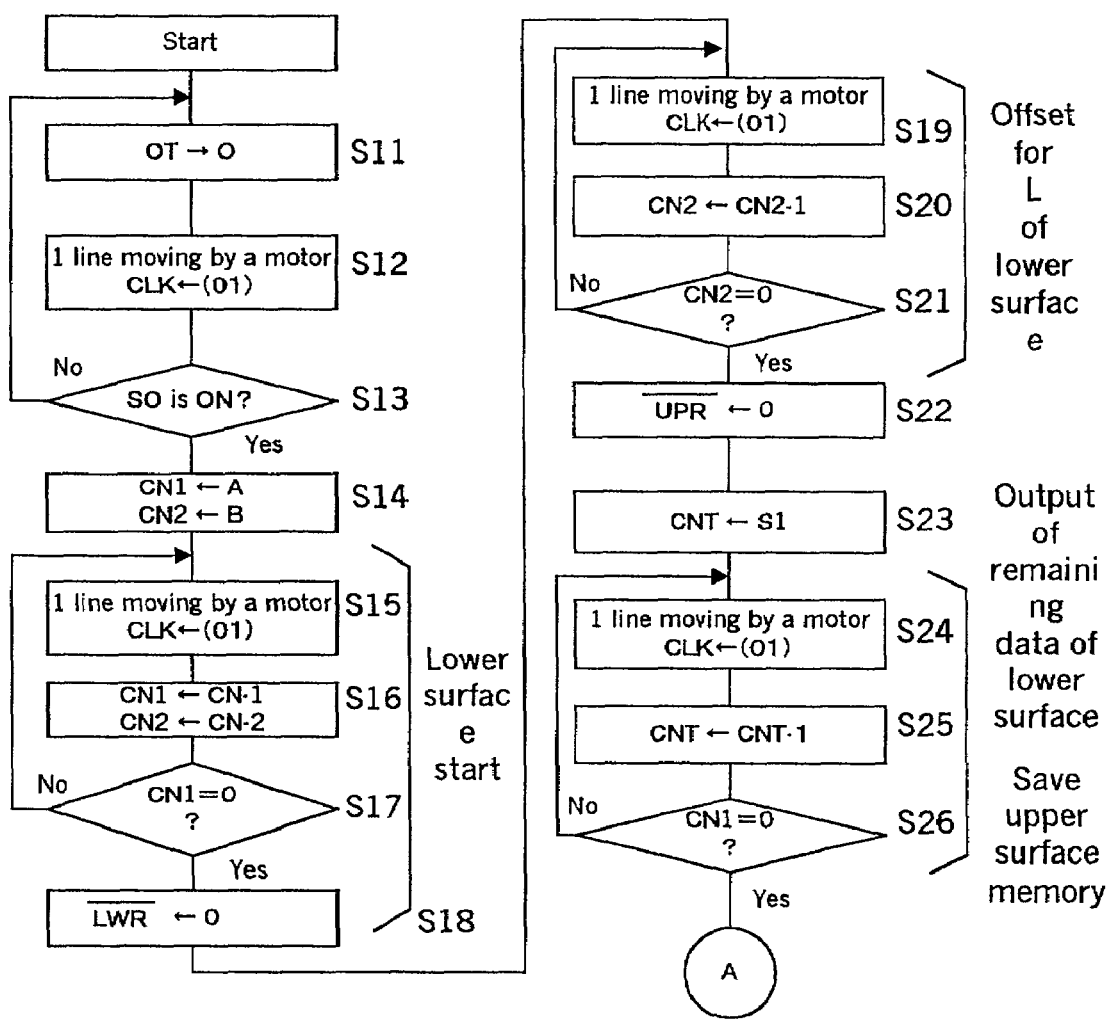
FIG. 11 is an example of the operation flowchart for the L amount offset along with FIG. 12.
Figure 12:
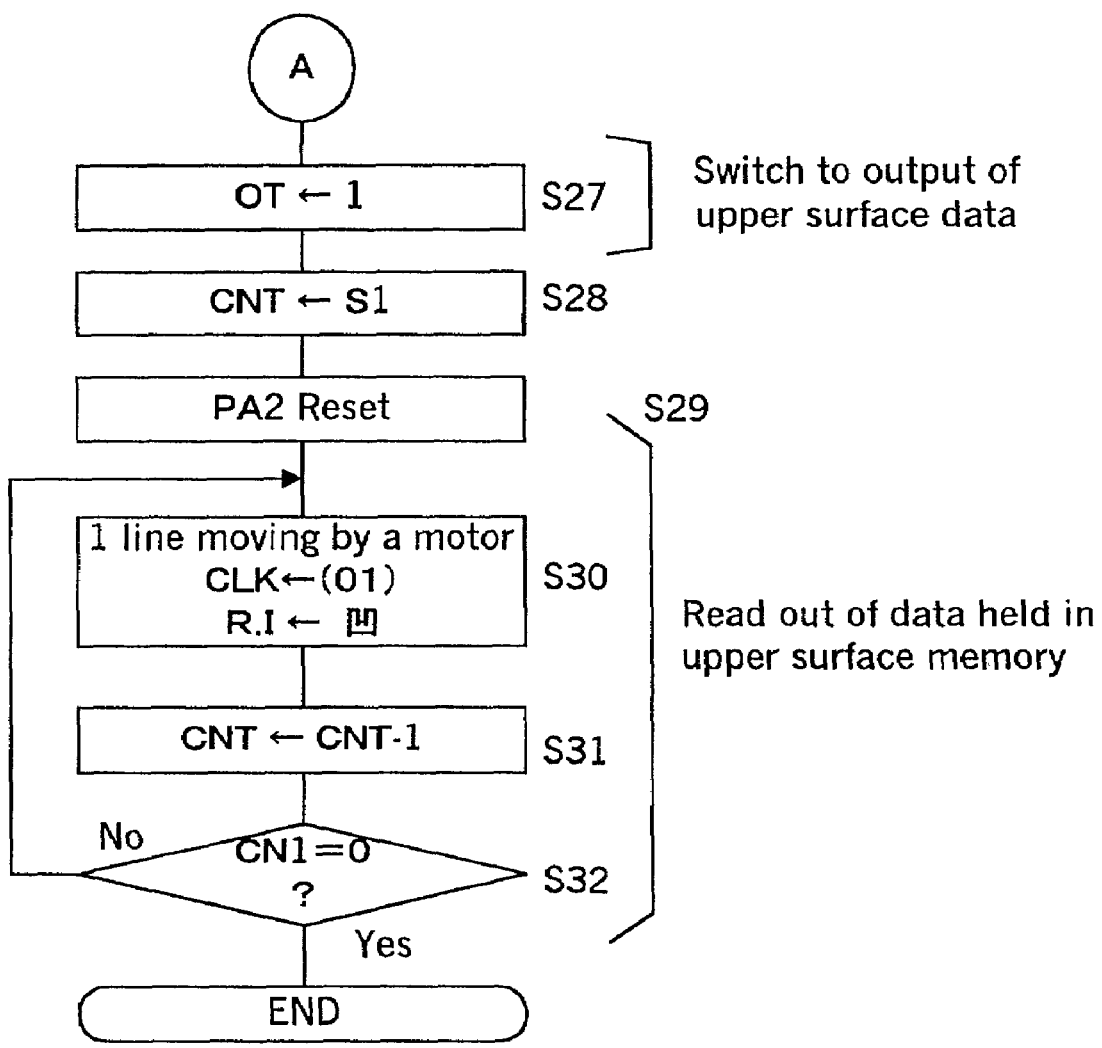
FIG. 12 is an example of the operation flowchart for the L amount offset along with FIG. 11.

FIG. 11 and FIG. 12 are examples of an operational flowchart to the offset L using the circuit shown in FIG. 10. In the explanation of FIG. 11 and FIG. 12, the positional relationships of the document detection sensor (document sensor) So accords to FIG. 14, and the reading position for the bottom surface of the document and the reading position for the upper surface of the document are made by the timing sequence for reading the images on both surfaces according to FIG. 13.

The position where the document detection sensor So is formed and the distance to the position to read the bottom surface of the document by the first image sensor is equivalent to the image line count A to be read. Also, the position where the document detection sensor So is formed and the distance to the position to read the upper surface of the document by the second image sensor is equivalent to the image line count B to be read. Therefore, the first image sensor and second image sensor can start reading the image data of both surfaces of the document after the leading edge of the document is detected and after the corresponding pulse counts A and B are counted. However, because there is the possibility of the document skewing in the transport path, G2 and G1 are set for the maximum values for the corresponding skew, so that the reading of the image data starts early in consideration of that.

Figure 13:
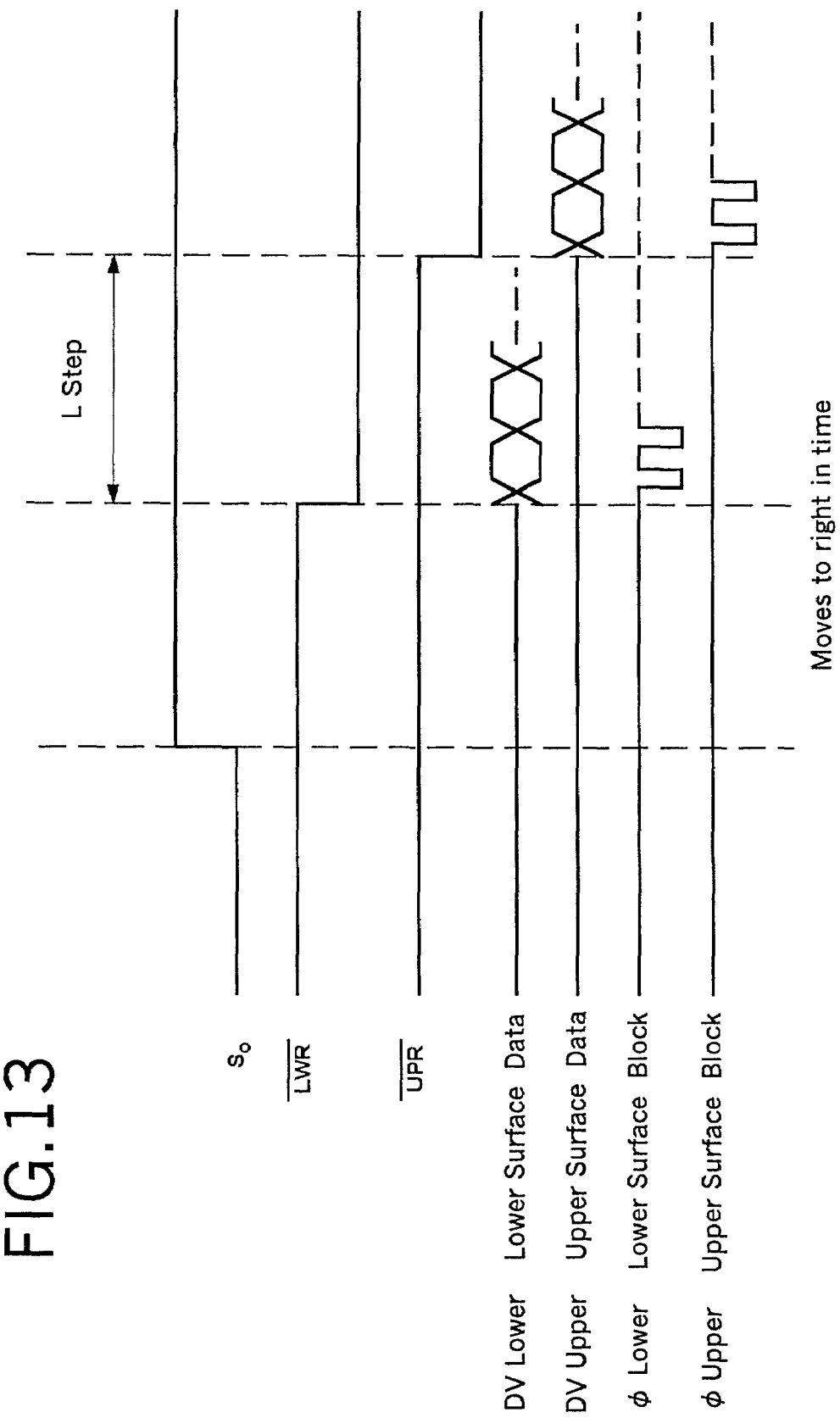
FIG. 13 is a sequence to explain the L amount offset control.
Figure 14:
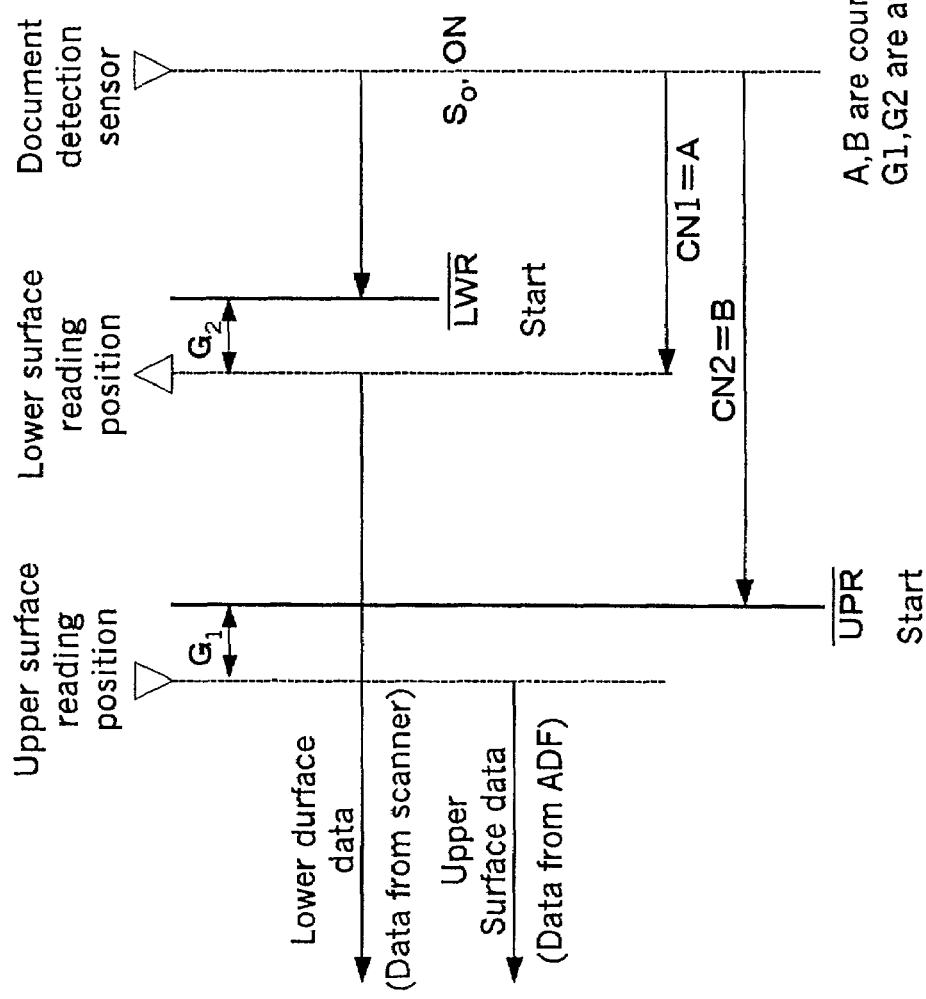
FIG. 14 shows a relationship of a document detection sensor and a reading position to explain the L amount offset control.
Figure 15:
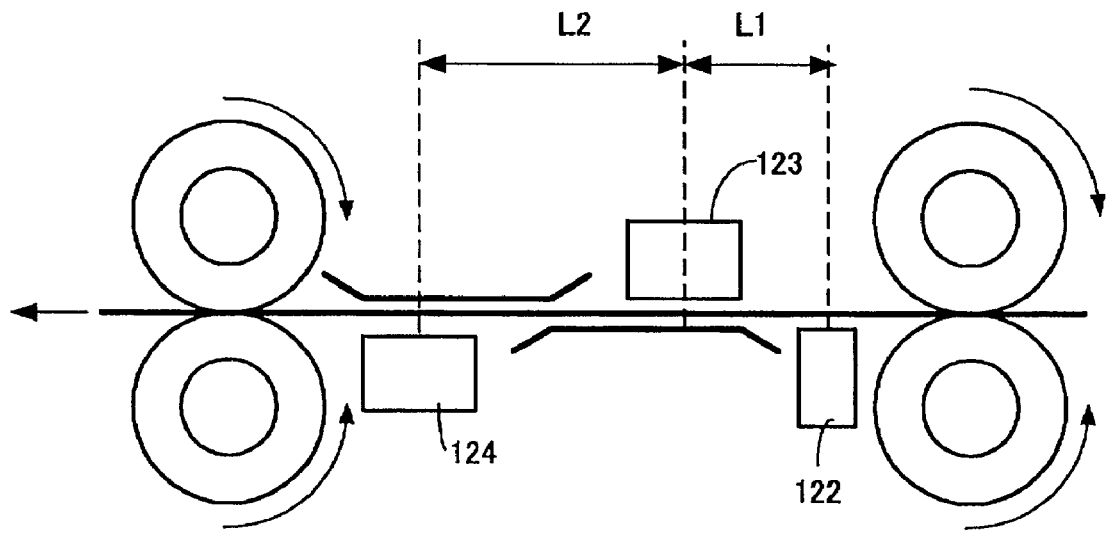
FIG. 15 is an example of the prior art.

As shown in FIG. 13 and FIG. 14, the reading of the image data on the bottom surface of the document starts by the rise of the signal LWR and takes the image data by synchronizing to the bottom surface clock signal prescribing the timing for reading the bottom surface. Furthermore, the reading of the image data on the upper surface of the document sheet starts with fall of the signal UPR and takes the image data by synchronizing to the upper surface clock signal.

In the operational flowchart of FIG. 11 and FIG. 12, each counter is set to its initial value (S11 and S12), and when the document detection sensor So detects the leading edge of the document, the counters CN1 and CN2 are respectively set to the numerical values A and B (S14). The numerical values A and B, as explained in FIG. 14, are values calculated into the line of the image (CLK) to read the distance between the set position of the document detection sensor So and the position for reading the bottom of the document by the first image sensor, and the distance between the set position of the document detection sensor So and the position for reading the top of the document by the second image sensor.

First, the top of the image data on the bottom surface of the document is set. Here, when the line to read is moved, the counters CN1 and CN2 decrement (S15 and S16). Then, when the counter CN1 reaches 0, the bottom surface reading signal LWR becomes active (S18) and reading of the bottom surface of the document starts with the first image sensor.

Next, the L offset for the image data on the bottom surface of the document sheet is performed. When the line to read is moved, the counter CN2 decrements (S20). Then, when the counter CN2 reaches 0 (S21), the upper surface reading signal UPR becomes active (S22) and reading of the upper surface of the document starts with the second image sensor. Here, the image data remaining on the bottom surface of the document is output and the image data for the upper surface of the document sheet is saved to the memory. Then, the numerical value S1 is set to the counter CNT (S23), and each time the line to read moves, the counter CNT decrements (S25). When it reaches 0 (S26), it switches to output the image data of the upper surface.

Next, S1 is set to the counter CNT (S28) and the address counter is reset (S29). Each time the line to read moves (S30), the counter CNT decrements (S31). When this reaches 0, the upper surface image data saved in memory is sequentially read.

As described in detail above, this invention controls to start the reading of the image data on both of the surfaces of the document by the first image sensor and the second image sensor after prescribed amount of time has passed since the leading edge of the document has been detected and to stop the reading of the image data on both surfaces of the document by the first image sensor and the second image sensor after a prescribed amount of time has passed since the trailing edge of the document has been detected.

Also, because the invention is configured to alternately output the image data of the line that was read on one surface of the document read by the first image sensor and the image data of the line that was read on the other surface of the document read by the second image sensor, high speed image processing efficiency is made.

Thus, in the image reading apparatus relating to this invention, the need to arrange a plurality of document detection sensors on a platen comprising two reading stations for reading the front and lower surfaces of a document sheet is eliminated while simplifying the timing control to start the reading of the image data. The first light source for the first image sensor and the second light source for the second image sensor are controlled to light just prior to the start of reading the image data for that particular surfaces of the document and are controlled to extinguish immediately after the stopping of the reading image data. Furthermore, while taking the image data from the surfaces of the document by the first image sensor and the second image sensor, the first light source and the second light source are controlled to suppress the quantity of lights from the light sources thereby minimizing the mutual interferences of lights irradiated from the two vertically opposing light sources to thereby effectively reduce the noise that occurs in the image data read from the surfaces of the document. Also, by controlling the lighting and extinguishing by grasping the positions of the image sensors to effectively use the document to shield light, the invention is further improved.

Also, a white light shield to shield the light from the first light source is arranged opposite to the second image sensor. These together prevent interferences of the lights from the first light source and the second light source, and because the white plate is arranged, it provides the apparatus that is capable of reading the image data even from a thin document.

While the invention has been explained with reference to the specific embodiment of the invention, the explanation is illustrative and the invention is limited only by the appended claims.

What is claimed is:

1. An image reading apparatus for reading images on two surfaces of a document transferred by an automatic document feeder one by one, comprising:
   a document detection sensor for detecting the document transported by the automatic document feeder;
   a first image sensor to read an image on one surface of the document;
   a second image sensor to read an image on the other surface of the document; and
   a control device connected to the first and second image sensors and the document detection sensor, said control device controlling the first image sensor and the second image sensor to take images based on a situation that the document detection sensor detects a leading edge of the document, said control device having counter means for counting time when the document detection sensor detects the leading edge of the document, and memory means for storing image data, said control device operating the counting means to start counting after the document detection sensor senses the leading edge of the document, starting to take the image data as effective data from the first image sensor when a counter value of the counter means reaches a predetermined first counter number, and starting to take image data from the second image sensor to the memory means when the counter value of the counter means reaches a predetermined second counter number different from the first counter number.

2. An image reading apparatus according to claim 1, wherein said first image sensor is composed of an optical reduction reading sensor, and said second image sensor is composed of a contact image sensor.

3. An image reading apparatus according to claim 1, further comprising a substantially straight transport path between said first image sensor and said second image sensor to transfer the document.

4. An image reading apparatus according to claim 1, wherein said control device outputs outwardly the image data of the second image sensor memorized in the memory means after outputting the image data of the first image sensor outwardly.

5. An image reading apparatus for reading images on two surfaces of a document transferred by an automatic document feeder one by one, comprising:
   first reading means having a first light source for irradiating light to one surface of the document to read an image on the one surface at a first reading position;
   second reading means having a second light source for irradiating light to the other surface of the document to read an image on the other surface at a second reading position separated for a predetermined distance away from the first reading position; and a control device connected to the first and second reading means, said control device turning on the second light source after a leading edge of the document passes the first reading position and before the second reading position, and turning off the first light source after a trailing edge of the document passes the first reading position and before the second reading position.

6. An image reading apparatus according to claim 5, wherein said first light source is comprised of a xenon lamp and said second light source is comprised of a light emitting diode.

7. An image reading apparatus according to claim 5, further comprising a document detection sensor for detecting the document transported by the automatic document feeder, said control device controlling said second light source to turn on after a first predetermined time has passed since the document detection sensor detects the leading edge of the document, and said first light source to turn off after a second predetermined time has passed since the document detection sensor detects the trailing edge of the document.

8. An image reading apparatus according to claim 7, further comprising a light shield to shield the light from the first light source arranged opposite to the second reading means, said first predetermined time being set to a period such that the leading edge of the document reaches an upstream edge of the light shield after the document detecting sensor detects the leading edge of the document.

9. An image reading apparatus according to claim 5, wherein said first and second reading positions are separated from each other such that the first and second reading means for reading the one and the other surfaces of the document are operated simultaneously.

10. An image reading apparatus according to claim 9, wherein said control device suppresses a quantity of light of at least one of said first light source and said second light source while simultaneously taking the image data from the first and the second reading means.

* * * * *